US010525727B2

(12) United States Patent
Greger et al.

(10) Patent No.: US 10,525,727 B2
(45) Date of Patent: Jan. 7, 2020

(54) SYSTEM AND METHOD TO ADAPT A QUANTITY OF A COATING SUBSTANCE APPLIED IN THE PRINTING TO A RECORDING MEDIUM

(71) Applicant: Océ Holding B.V., Venlo (NL)

(72) Inventors: Oliver Greger, Munich (DE); Paulo Correira Silverio, Markt Schwaben (DE)

(73) Assignee: Océ Holding B.V., Venlo (NL)

( * ) Notice: Subject to any disclaimer, the term of this patent is extended or adjusted under 35 U.S.C. 154(b) by 0 days.

(21) Appl. No.: 15/879,252

(22) Filed: Jan. 24, 2018

(65) Prior Publication Data

US 2018/0207949 A1    Jul. 26, 2018

(30) Foreign Application Priority Data

Jan. 24, 2017    (DE) .................. 10 2017 101 289

(51) Int. Cl.
*B41J 2/21*    (2006.01)
*B41J 11/00*    (2006.01)
(Continued)

(52) U.S. Cl.
CPC ......... *B41J 2/2132* (2013.01); *B41J 11/0015* (2013.01); *G06K 9/6202* (2013.01);
(Continued)

(58) Field of Classification Search
CPC ...... B41J 2/2114; B41J 2/2054; B41J 2/2132; B41J 11/0015
See application file for complete search history.

(56) References Cited

U.S. PATENT DOCUMENTS 6,267,476 B1 *  7/2001  Kato .................... B41J 2/17513
                                                      347/100
6,585,369 B1 *  7/2003  Sievert .................. B41J 2/2135
                                                      347/101
(Continued)

FOREIGN PATENT DOCUMENTS

DE         10233409 A1    2/2004
DE      102014108342 A1    12/2015
(Continued)

OTHER PUBLICATIONS

Automated Translation of Jan. 25, 2018—NPL #1—Provided by STIC Translations, Dec. 13, 2018. (Year: 2018).*
(Continued)

*Primary Examiner* — John Zimmermann
(74) *Attorney, Agent, or Firm* — Schiff Hardin LLP

(57) ABSTRACT

In a method for automatic adaptation of a quantity of a coating substance, a coating substance is inkjet printed to a printing region of the recording medium; a first color is over printed across a width of the printing region of the recording medium and atop the coating substance; a print image of a second color is over printed atop the first color; the printing region having been printed to is sensory recorded; a local bleeding behavior of the first and the second colors is analyzed based on the sensory recording; and a printed quantity of the coating substance is locally adapted, based on the analysis of the local bleeding behavior, in segments of the printing region that are affected by bleeding.

18 Claims, 7 Drawing Sheets

(51) Int. Cl.
*G06T 7/13* (2017.01)
*G06T 7/90* (2017.01)
*H04N 1/60* (2006.01)
*H04N 1/00* (2006.01)
*G06K 9/62* (2006.01)

(52) U.S. Cl.
CPC .................. *G06T 7/13* (2017.01); *G06T 7/90* (2017.01); *H04N 1/00251* (2013.01); *H04N 1/605* (2013.01); *G06T 2207/10024* (2013.01); *G06T 2207/30176* (2013.01); *H04N 2201/0082* (2013.01)

(56) References Cited

U.S. PATENT DOCUMENTS

| | | | |
|---|---|---|---|
| 2002/0015085 A1* | 2/2002 | Moriyama | B41J 2/2114 347/101 |
| 2006/0066653 A1 | 3/2006 | Konno | |
| 2014/0323602 A1* | 10/2014 | Weigert | B29B 17/02 521/48 |
| 2016/0259289 A1 | 9/2016 | Gerlach et al. | |

FOREIGN PATENT DOCUMENTS

| | | |
|---|---|---|
| DE | 102015103100 B3 | 12/2015 |
| WO | 2014065793 A1 | 5/2014 |

OTHER PUBLICATIONS

German Search Report dated Oct. 16, 2017 for German application No. 10 2017 101 289.3.

\* cited by examiner

SYSTEM AND METHOD TO ADAPT A QUANTITY OF A COATING SUBSTANCE APPLIED IN THE PRINTING TO A RECORDING MEDIUM

CROSS REFERENCE TO RELATED APPLICATIONS

This patent application claims priority to German Patent Application No. 102017101289.3, filed Jan. 24, 2017, which is incorporated herein by reference in its entirety.

BACKGROUND

The disclosure relates a method for automatically adapting a quantity of a coating substance, including a primer that is applied upon printing to a recording medium in a printing system, and a corresponding printing system.

The present disclosure, as well as the underlying problem, are explained in detail in the following using inkjet printing. However, the disclosure is not limited to inkjet printer and is applicable to various other printing methods and/or printing technologies (e.g. liquid toner).

In inkjet printing, a multicolor, contact-less, direct printing takes place that is based on thermal or electrophysical principles. For example, inkjet printing is explained in the publication DE 102 33 409 A1.

Numerous measures exist for quality improvement in inkjet printing. For example, ink in the print heads may age due to too low a throughput. Therefore, regularly interspersed regeneration print images, what are known as refresh lines, are used—in particular in high-capacity printing systems—to regenerate the nozzles (print nozzles) of the print heads between the printing of print data-based print images. For example, this is described in the publication DE 10 2014 108 342 A1.

An additional problem of what is known as "bleeding" or "color bleeding" may occur if an ink of one color is applied onto or in immediate proximity next to an ink of a different color. This problem is expressed in a mixing or merging of the two inks at their interface, whereby the boundary line between the inks becomes unclear, for example blurs at the outer edges. This phenomenon is caused by capillary forces, whereby the printing inks are drawn into adjacent regions. For example, the adhesion of toner particles on the surface of the recording medium may be increased via pre-treatment with a coating substance, such that the bleeding is avoided. This is described in WO 2014/065793 A1, for example.

In the field of a different printing technology, photoelectric liquid toner printing, there also exist printing systems that adapt a property—in particular the composition—of the coating layer applied for pre-treatment of a recording medium during the printing operation, based on a sensor analysis of the print image. A coating substance is hereby adapted in terms of its composition by means of a mixer and is applied onto a recording medium by means of a roller. Such a system is described in DE 10 2015 103 100 B3.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
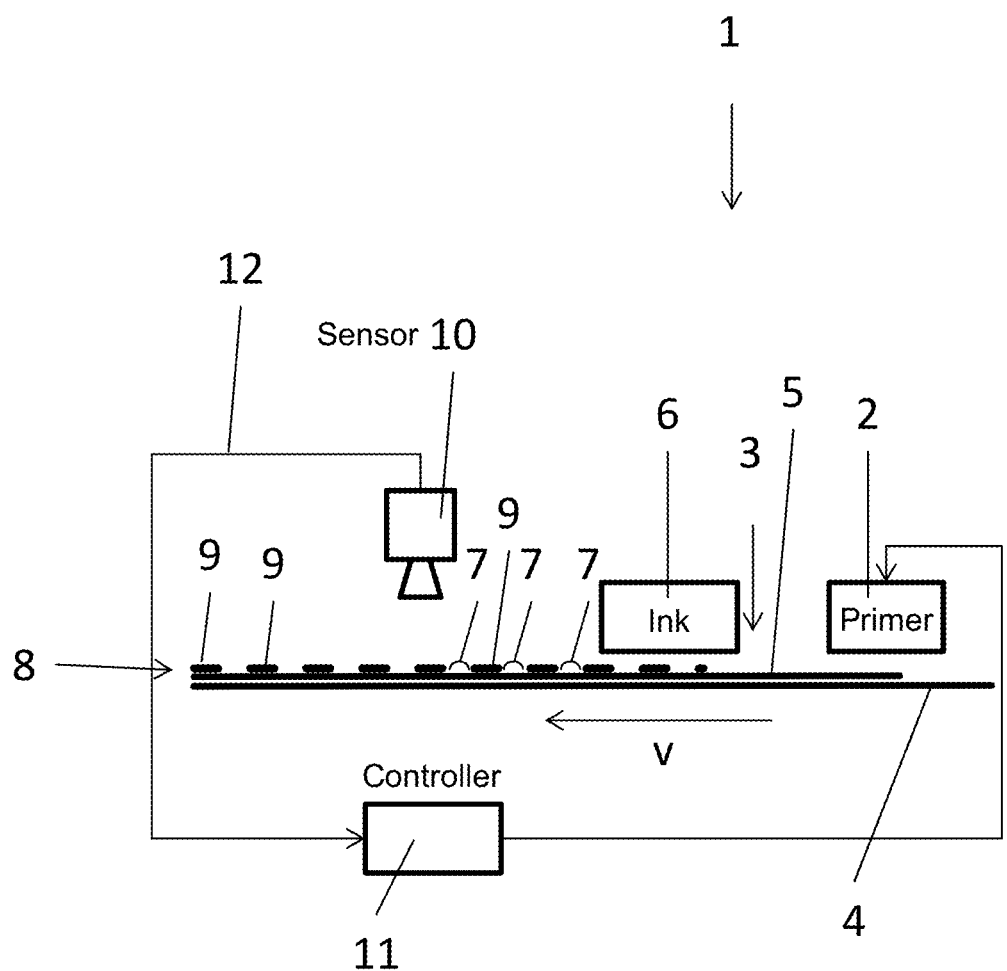
FIG. 1 illustrates a schematic diagram a printing system according to an exemplary embodiment of the disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

In light of this background, an object of the present disclosure is to provide improved method for automatic adaptation of a quantity of a coating substance (e.g. a primer) that is applied in a printing system upon printing to a recording medium.

The disclosure relates to a method for automatic adaptation of a quantity of a coating substance (e.g. a primer) that is applied in a printing system upon printing to a recording medium. In an exemplary embodiment can include:

inkjet printing to a printing region of a recording medium with a coating substance;

overprinting of a first color across the width of the printing region of the recording medium that was printed to with the coating substance;

overprinting of a regular print image of a second color on the first color;

sensory recording of the printed printing region; analysis of the local bleeding behavior of the first and second colors using the sensory recording; and local adaptation of the overprinted quantity of the coating substance in segments of the printing region that are affected by bleeding.

The disclosure also relates to a printing system that can be configured to implement a method according to one or more exemplary embodiments of the disclosure for automatic adaptation of a quantity of a coating substance that is applied in the printing to a recording medium. In an exemplary embodiment, the printing system includes: a primer inkjet station for printing to a printing region of a recording medium with a coating substance; an ink inkjet station for overprinting a first color across the width of the printing region of the recording medium that was printed to with the coating substance, and for overprinting a regular print image of a second color on the first color; a sensor for sensory recording of the printed printing region; a controller coupled with the sensor and the primer inkjet station for analyzing the local bleeding behavior of the first and second colors using the sensory recording, and for local adaptation of the printed quantity of the coating substance in segments of the printing region that are affected by bleeding.

The realization underlying the present disclosure is that, on the one hand, different types of recording media or substrates require different pre-treating with coating substances; on the other hand, however, locally different treatments of the recording medium may also be necessary.

Exemplary embodiments relate to an inkjet printing method for application of the coating substance, such as a primer. The method can include adapting the applied quantity of the coating substance so as to be locally matched to the recording medium. The current local bleeding behavior of different colors applied for this purpose is analyzed as an indicator of the required quantity of the coating substance. In an exemplary embodiment, a sensory recording of the printed printing region is performed and the sensory recording is analyzed. The applied quantity of the coating substance is then adapted locally (based on the analyzed sensory recording) to the region of the segments affected by bleeding.

In an exemplary embodiment, in this way, a previously unknown synergy of devices of the inkjet printing systems is utilized. In an exemplary embodiment, a sensor configured to monitor of the print image (e.g. an inline camera), can also be configured to identify the locations to be adapted with regard to the quantity of the coating substance. Moreover, in terms of design, inkjet print heads are always provided with only locally acting print nozzles whose local effect may be individually affected by control technology (e.g. a controller of the printing system). According to the present disclosure, this possibility is utilized to locally adapt the applied quantity of the coating substance. The local adaption can be based on the print image recorded with the sensor. The sensory recording via the sensor therefore enables a regulation of the local quantity of the applied coating substance to improve the print quality.

In an exemplary embodiment, the inkjet printing to the printing region of the recording medium with a coating substance includes an area inkjet printing over the entire width of the printing region. In one or more exemplary embodiments, based on the local adaptation, quantities of the coating substance or primer are locally varied over the width of the recording medium. Advantageously, a constant print quality may thus be achieved even given substrate changes or fluctuations in the substrate properties of the recording medium.

A possible different or varying print behavior (jetting behavior) of the print heads or individual print nozzles of the primer inkjet station may also be compensated according to the disclosure.

Advantageously, the creating of proofs for qualification can be reduced or omitted. The typical paper qualification method can also be omitted, which saves on material and time cost.

In an exemplary embodiment, since a possible length of a printing region is typically determined via a feed of the recording medium, a local adaptation of the printed quantity of the coating substance is performed in segments of the width of the printing region that are affected by bleeding.

In an exemplary embodiment, the quantity of the applied coating substance, in particular the applied primer quantity, can be selected at a lower bound of the functional range or of the functional parameter window, since this enables an economical printing without excessive consumption of the coating substance. In an exemplary embodiment, a local adaptation of the printed quantity of the coating substance will therefore be provided, normally in the form of a local increase of the quantity. Theoretically, however, the quantity of the applied coating substance may also be too high. In this instance, a cracking of the color separation occurs, what is known as the "mud cracking" effect. It would be conceivable to also register this instance in the sensory recording of the printing region that is printed to, to detect it in the course of the analysis of the bleeding behavior, and to locally reduce the applied quantity of the coating substance as a result.

In an exemplary embodiment, the recording of the printed print image takes place across the entire width of the printing region and/or across the printing region printed to with both colors.

The printing region may be a maximum printing region as technically predetermined by the printing system that is used, or a maximum printing region as predetermined by the width of the recording medium, or a freely selected or set maximum printing region.

In an exemplary embodiment, the method according to the disclosure is usable with an inkjet printing system. In an exemplary embodiment, the printing system according to the disclosure can be configured as an inkjet printing system.

All features of the method for automatic adaptation of a quantity of a coating substance that is applied in the printing to a recording medium in a printing system are transferable to a corresponding printing system, and vice versa.

Additional possible embodiments, developments and implementations of the disclosure include combinations of previous features or features of the disclosure that are described in the following with regard to the exemplary embodiments, even if not explicitly cited. In particular, the person skilled in the art will thereby also add individual aspects as improvements or additions to the respective basic form of the present disclosure.

In Figures of the drawings, elements, features and components that are identical, functionally identical and have the same effect are—insofar as is not stated otherwise—respectively provided with the same reference character.

FIG. 1 shows a schematic connection diagram of an exemplary embodiment of a printing system 1.

In an exemplary embodiment, the printing system 1 includes a primer inkjet station 2 configured to print to a printing region 3 of a recording medium 4 with a coating substance 5.

In this depicted embodiment, the recording medium 4 has been coated with the coating substance 5 over its entire area, but is not limited thereto.

In an exemplary embodiment, the primer inkjet station 2 has one or more inkjet print heads (not individually depicted here) which respectively contain a plurality of individually controllable print nozzles.

The printing system 1 can also include an ink inkjet station 6. In an exemplary embodiment, the ink inkjet station 6 is configured to print arbitrary colors and shapes in arbitrary order and/or composition. Ink inkjet stations are fundamentally known to a person of ordinary skill in the art.

In an exemplary embodiment, with regard to the method for automatic adaptation of a quantity of a coating substance that is applied in the printing to a recording medium, the ink inkjet station 6 is used for printing of a first color 7 over the width of the print region 3 of the recording medium 4 that is printed to with the coating substance 5, and for printing of a regular print image 8 of a second color 9 atop the first color 7. This is explained in further detail with regard to the method according to FIG. 2.

In an exemplary embodiment, the printing system 1 also includes a sensor 10 configured to sensory record the printed printing region 3. For example, the sensor 10 can be a camera (e.g. an inline camera), but is not limited thereto. The sensor 10 can be integrated into the printing system 1. The sensor recording via the sensor 10 enables a regulation of the local quantity of the applied coating substance 5 to improve the print quality. In an exemplary embodiment, the sensor 10 provides the sensed information to the controller 11, which is configured to generate the sensory recording. In another embodiment, the sensor 10 is configured to sense and generate the sensory recording, and to provide the sensor recording to the controller 11.

In an exemplary embodiment, controller 11 is coupled with the sensor 10 and the primer inkjet station 2. In an exemplary embodiment, the controller 10 is configured to analyze the local bleeding behavior of the first and second colors 7, 9 based on the sensory recording 12. In an exemplary embodiment, the controller 11 includes processor circuitry that is configured to perform one or more operations and/or functions of the controller 11.

For example, the controller 11 can include a processor and a memory. The memory can include a database of comparison values or nominal values and/or tolerances. In particular, the processor can be configured to execute or otherwise implement an algorithm for analysis of the bleeding behavior, which can include examination of the color deviation and/or examination of the line thickness, edge smoothness and/or edge sharpness of the print image applied with the second color.

In an exemplary embodiment, the algorithm is configured to assess the line thickness, edge smoothness and/or edge sharpness of a line, which will subsequently be explained in further detail with regard to FIGS. 7 through 9; a comparison with a nominal value; the establishment of possible segments affected by bleeding, using deviations (peaks) from the nominal value beyond a predetermined tolerance; and the introduction of a local adaptation of a printed quantity of the coating substance 5.

Figure 10:
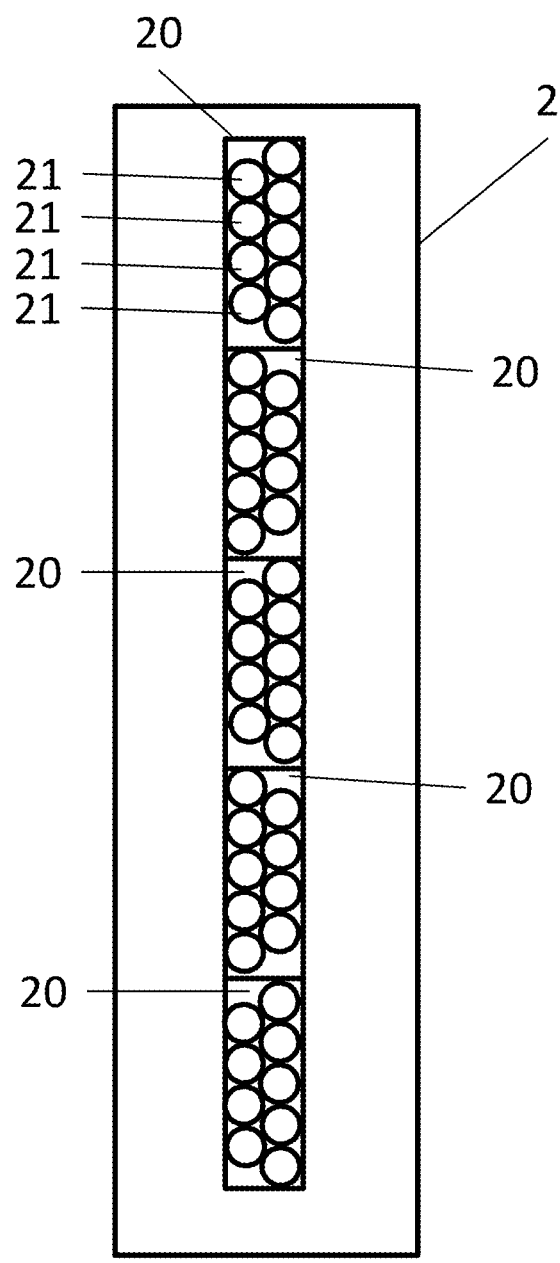
FIG. 10 illustrates a schematic depiction of a primer inkjet station according to an exemplary embodiment of the disclosure.

Accordingly, in an exemplary embodiment, the controller 11 is configured to activate the primer inkjet station 2 for local adaptation of the printed quantity of the coating substance 5 in segments of the printing region 3 that are affected by bleeding (or possibly mud cracking), which can be determined by the controller 11 based on the sensory recording. In particular, as depicted in FIG. 10, the controller 11 configured to activate individual print heads 20, which can include the activation of individual groups of print nozzles 21. In an exemplary embodiment, individual print nozzles 21 can be activated to apply the coating substance corresponding to the required adaptation of the quantity of the coating substance. For example, for this, individual print nozzles 21 may be variably activated by the controller 11 with regard to the droplet size they eject.

In an exemplary embodiment, the printing system 1 depicted in FIG. 1 includes an intake group (not shown) with which the recording medium 4 is initially supplied to the primer inkjet station 2, and subsequently to the ink inkjet station 6. A takeoff group (not shown) for transporting the printed recording medium away may also be provided following the sensor 10.

Figure 2:
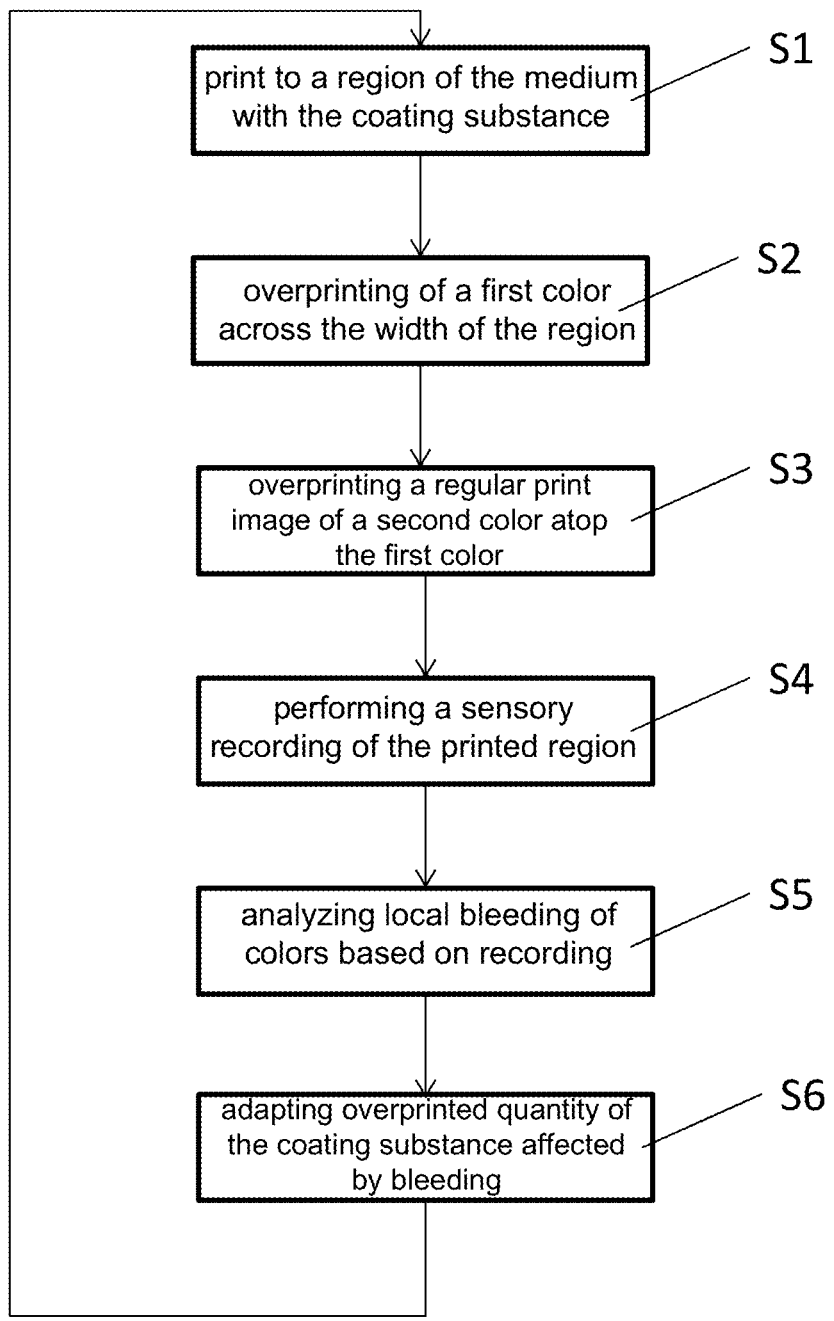
FIG. 2 illustrates flowchart of an adaptation method according to an exemplary embodiment of the disclosure.

FIG. 2 shows a flowchart of an adaptation method according to an exemplary embodiment.

In an exemplary embodiment, the method includes an automatic adaptation of a quantity of a coating substance that is applied upon printing to a recording medium in a printing system, in particular in an inkjet printing system.

In an exemplary embodiment, according to a first step S1 of the method, a printing region 3 of a recording medium 4 is printed to with the coating substance 5 via inkjet printing (see FIG. 3A, details later in this regard). In an exemplary embodiment, in the event of a later inkjet printing of the colors to be printed, a primer is applied as a coating substance 5. The primer improves the adhesion of the color particles of the subsequently applied colored ink and/or causes a flocculation of the color so that this directly adheres onto the recording medium 4. For this, a first, uniform separation of the coating substance 5 is printed with one or more inkjet print heads 20 arranged across the width of the printing region 3, which inkjet print heads 20 respectively contain a plurality of (e.g. individually addressable) print nozzles 21. In an exemplary embodiment, the local quantity of the applied coating substance 5 (i.e. the quantity ejected at individual print heads 20 or individual print nozzles 21) may be adapted individually via the method. On the one hand, this is necessary given different recording media, but may also be advantageous due to fluctuations of properties of a recording medium across its width or length.

A second step S2 includes the overprinting of a first color 7 across the width of the printing region 3 of the recording medium 4 that was printed to with the coating substance 5 (see FIG. 3B, details in this regard later). This can be performed with a conventional ink inkjet station. In this example, ink inkjet station 6 is a conventional ink inkjet station. In an exemplary embodiment, a contiguous area of the first color 7 is thereby overprinted. In an exemplary embodiment, it is thus an area overprinting of the first color 7 across the width of the printing region 3.

In an exemplary embodiment, the first color is overprinted across a predetermined length and across the entire width of the printing region of the recording medium that is printed to with the coating substance.

An additional step S3 of the method includes the overprinting of a regular print image 8 of a second color 9 atop the first color 7. Insofar as an ink inkjet station 6 is used for overprinting of the colors 7, 9, the second color 9 is also overprinted using inkjet printing.

In particular, the regular print image 8 of the second color 9 is an overprinting of the second color 9 across the width of the printing region 3 atop the first color 7. For example, the regular print image 8 may be overprinted entirely atop the planar overprinted first color 7. A partial overlap of the first and second colors 7, 9 would also be conceivable.

In an exemplary embodiment, the first color 7 is selected and provided with a high contrast relative to the second color 9. A high contrast of the colors 7, 9 facilitates the later analysis of the bleeding behavior.

In an exemplary embodiment, the regular print image 8 has at least one edge between the first and second color 7, 9 that is continuous, or regularly repeating, across the width—such as the entire width—of the printing region 3. Such an edge allows the analysis of the bleeding behavior under the same requirements across the entire width of the printing region 3.

In an exemplary embodiment, the regular print image 8 of the second color 9 is overprinted atop the first color in the form of a regular pattern. In particular, it may be a regular pattern of thin lines. This may have the most different embodiments, for example a plurality of parallel lines or a plurality of intersecting lines. The bleeding behavior can advantageously be analyzed particularly well using thin lines.

Figure 3A:
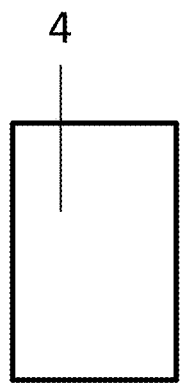
FIGS. 3A to 3D illustrate various states of the recording medium corresponding to the adaptation method according to an exemplary embodiment of the disclosure.
Figure 3B:
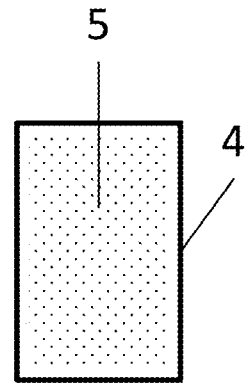
Figure 3C:
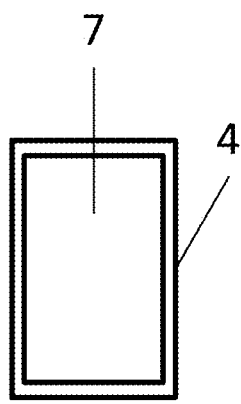
Figure 3D:
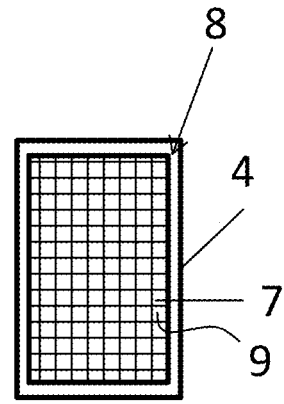

In an exemplary embodiment, the regular pattern is provided in the form of a regular grid of thin lines (see FIG. 3D in this regard, for example). This advantageously allows not only the examination of individual lines but also examinations of the color deviation. Such a grid generates an overall color impression which is measurable with typical measurement methods, for example color spectroscopy, to determine the color deviation, for example of a Delta E value. If bleeding now occurs, this leads to a color deviation relative to a print image without bleeding. For example, if the first color is a light color, in particular yellow, and if the second color is a dark color, in particular black, the overall color impression due to the bleeding would be darker, such that a measurable color deviation is created.

In an exemplary embodiment, the thin lines are overprinted in the form of a single-point line. This is the thinnest printable line, which advantageously allows a maximum precision in the analysis of the bleeding behavior.

An additional step S4 of the method includes a sensory recording of the printed printing region 3. The sensory recording may be the most varied sensory methods that are suitable for recording a printing region 3.

In an exemplary embodiment, the sensor recording of the printed print image is performed by a camera integrated into the printing system 1 and directed toward the recording medium 4, which camera represents the sensor 10 in this instance. It is thereby in particular what is known as an inline system, or what is known as an inline camera or ILS camera, which is integrated into the printing system 1 and represents a part of the control loop provided in the printing system 1 for automatic adaptation of the quantity of the coating substance 5.

In an exemplary embodiment, the recording of the printed printing region 3 includes a measurement of a color deviation in the region of the regular print image 8, in particular of a regular pattern, of the second color 9. For example, this may be performed by a Delta E measurement using specialized color spectroscopy.

An additional step S5 of the method includes the analysis S5 of the local bleeding behavior of the first and second colors 7, 9 using the sensory recording.

In an exemplary embodiment, the analysis may be performed via a determination of a color deviation, in particular a determination of a Delta E value. In the latter instance, the analysis of the bleeding behavior includes a comparison of the color deviation, in particular of a measured Delta E value, with a predetermined nominal value and/or predetermined tolerances of the color deviation.

Insofar as a continuous or repeating edge is provided between the first and second color, the bleeding behavior of the first and second colors along the edge may be analyzed. In this instance, the analysis of the bleeding behavior may include an assessment of the edge smoothness and/or edge sharpness of the edge, in particular in the form of a comparison with predetermined nominal values and/or tolerances. For example, this is performed using a measurement of the thickness of lines of the second color or using a measurement of an edge smoothness and/or edge sharpness of the edge present between the first color and second color, which is discussed in further detail with regard to FIG. 7 through 9. In an exemplary embodiment, the controller 11 is configured to measure the thickness of lines, edge smoothness, and/or edge sharpness.

Furthermore, the method includes a step S6 of the local adaptation of the overprinted quantity of the coating substance 5 in segments of the printing region 3 that are affected by bleeding.

In an exemplary embodiment, the local adaptation of the printed quantity of the coating substance 5 includes an activation of individual inkjet print heads 20, which can include activation of individual groups of inkjet print nozzles 21 or especially the activation of individual inkjet print nozzles 21, for the local application of the adapted quantity of the coating substance 5, for example as is depicted in FIG. 10. A precise local adaptation is thus enabled. For example, for this the inkjet print heads, groups of inkjet print nozzles or individual inkjet print nozzles that are to be adapted for the local adaptation of the printed quantity of the coating substance may be identified using a position of the segments of the width of the printing region 3 that are affected by bleeding, and/or may be individually activated for adaptation.

In an exemplary embodiment, the method runs during a regular printing process. In particular, the overprinting of the first and second color 7, 9 is performed during a regular printing process. For example, for this the first and second color 7, 9 may be applied in the course of a routine printing of a regeneration print image or of refresh lines. It is also conceivable to provide the printing of the first and second color 7, 9 integrated with the refresh lines, or as or in the form of refresh lines. An additional possibility exists in a printing of the first and second colors 7, 9 at an edge of the recording medium that is provided for cutting, in particular an edge extending beyond the width of the printing region.

FIG. 3A through 3D show various states of the recording medium 4 according to an exemplary embodiment.

FIG. 3A schematically shows a recording medium 4 in the unprinted state. For example, it may thereby be a paper sheet. However, it may similarly be a web or roll of a recording medium 4, for example a paper web or paper roll. The most varied paper types are considered for this, for example glossy or matte paper types, as well as the most varied other substrates that are suitable as recording media, for example also films of plastic and/or metal foils, in particular aluminum, or rolls, webs or sheets containing cardboard, composite materials or the like.

FIG. 3B shows the recording medium 4 with coating substance 5 applied thereupon, for example after step S1. In particular, the coating substance 5 is what is known as a primer. For example, this may be provided as an aqueous salt solution which reacts with the colored ink of the ink inkjet station 6 and produces a flocculation of the color, such that this directly adheres to the recording medium 4 upon overprinting.

In an exemplary embodiment, the primer is colorless or not visible or perceptible in the printed state on the recording medium. In this way, the print image is not negatively affected.

The printing to the recording medium 4 with the coating substance 5 is performed in the primer inkjet station 2. It is thereby a continuous process, where the coating substance 5 is applied uniformly across the width of the recording medium 4 and the recording medium 4 is conveyed with a regular feed, as is indicated with the arrow v in FIG. 1.

In FIG. 3B, the inherently invisible coating substance 5 is merely schematically depicted with dots applied on the recording medium 4. The coating substance 5 may thereby be applied onto the recording medium 4 over an area, such as over the whole area across the entire printing region 3.

FIG. 3C shows the recording medium 4 with first color 7 overprinted atop the coating substance 5, for example according to step S2 in FIG. 2.

Here the first color 7 is likewise shown overprinted atop the entire area of the recording medium 4, purely schematically and as an example. However, it may also be a region of the first color 7 that is overprinted in an area only across a predetermined length (in the printing or feed direction) and across the entire width of the recording medium 4. It would also be conceivable to apply the first color 7 only as a line, such as a comparably thick line with a thickness of at least multiple dots. In this instance, the thickness would need to be chosen sufficiently so that at least an overlap with the thin line of the second color 9 is enabled.

FIG. 3D shows the recording medium 4 with the second color 9 overprinted atop the first color 7. As an example, here the second color 9 is applied in the form of thin lines arranged in the shape of a grid. These are thereby single-point lines, meaning lines having a thickness of only one image point, which represents the thinnest printable line thickness, for example according to step S3 in FIG. 2.

Figure 4:
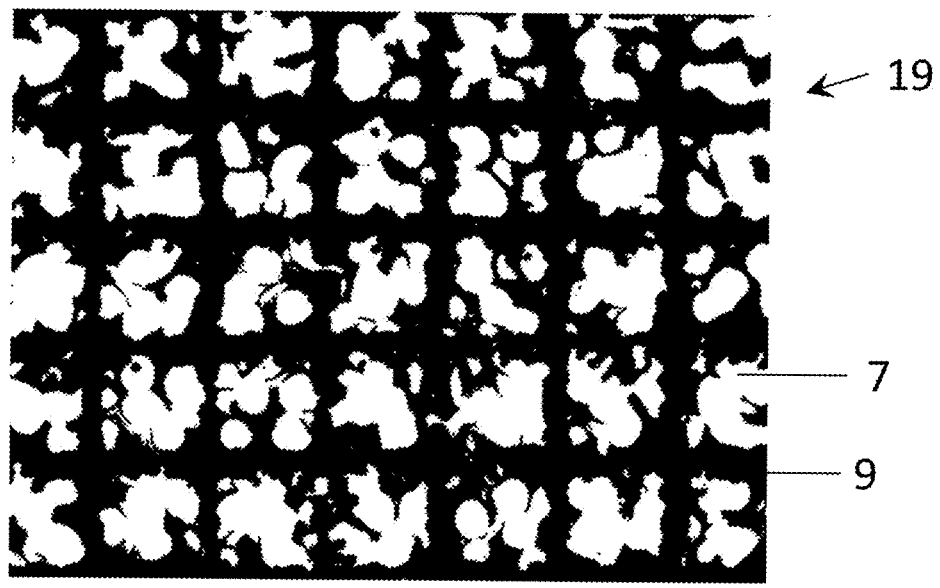
FIG. 4 illustrates an example of a sensory recording of a segment of the printing region according to an exemplary embodiment of the disclosure with too small a quantity of a coating substance.

FIG. 4 shows an example of a sensory recording of a segment 19 of the printed printing region 3 with too small a quantity of a coating substance 5.

Here, the recording is provided in the form of an image acquisition. However, other types of sensory recording are possible. In an exemplary embodiment, the image acquisition is recorded line by line and is subsequently assembled into a 2D exposure (e.g. by the controller 11).

Shown are regions of first color 7 and second color 9 which have solidly flown into one another. This merging of the colors, which is commonly referred to as bleeding, is to be avoided to produce a high print quality.

The cause of the bleeding is too low a quantity of coating substance or primer on the recording medium. Accordingly, the first and second color 7, 9 do not adhere to the recording medium and run into one another due to capillary effects.

Figure 5:
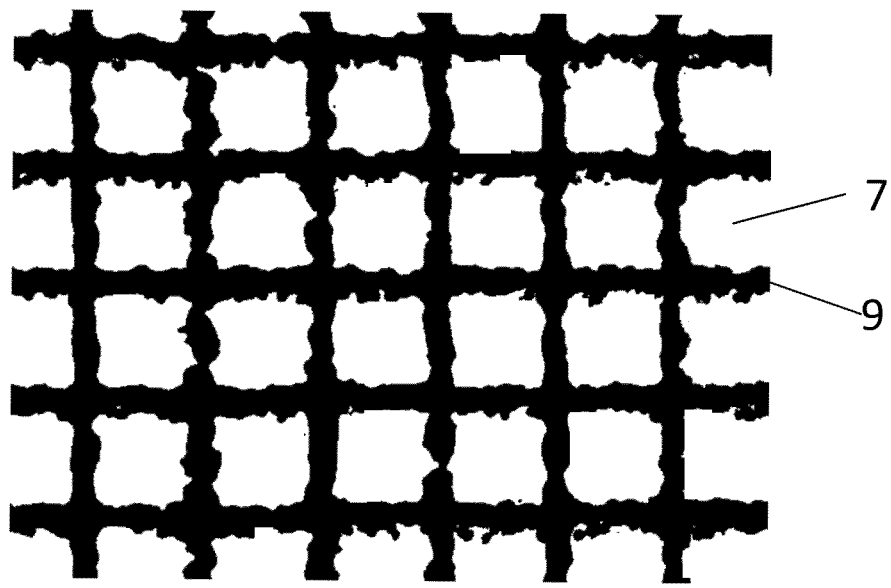
FIG. 5 illustrates an example of sensory recording of a segment of the printing region according to an exemplary embodiment of the disclosure with a suitable quantity of a coating substance.

FIG. 5 shows an example of a sensory recording of a segment of the printing region with a suitable quantity of a coating substance. In order to achieve a uniform appearance, a specific amount of merging of the individual print dots is desired, as is apparent in FIG. 5. The individual points of the grid 9 fuse to form a solid line.

Here it is not difficult to perceive a significantly sharper boundary of the regions of first color 7 and second color 9. The lines applied with the second color 9 have a markedly more uniform line width and shape in comparison to FIG. 4.

Due to a sufficient quantity of coating substance or primer, the first and second color 7, 9 here adhere directly to the recording medium after the overprinting, such that the effect of the bleeding as in FIG. 4 does not occur.

Figure 6:
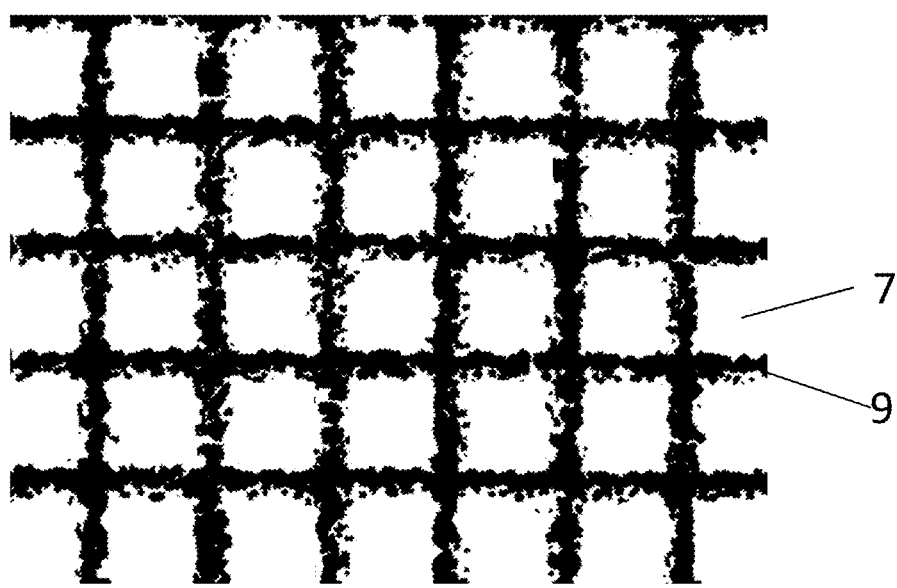
FIG. 6 illustrates an example of sensory recording of a segment of the printing region according to an exemplary embodiment of the disclosure with too great a quantity of a coating substance.

FIG. 6 shows an example of a sensory recording of a segment of the printing region with too high a quantity of a coating substance. This leads to the situation that the individual points of the second color 9 can no longer merge, such that the individual points in the print image are now visible.

In FIG. 6 it is well apparent that the lines of the second color 9 are not contiguous and have a plurality of dots.

If such a print image occurs, the quantity of coating substance must be reduced to produce a high print quality. In practice, this instance will occur rather seldom since the coating substance quantity is normally calculated in a lower range of the parameter window in order to enable an economical printing and to keep the coating substance consumption as low as possible.

The analysis (e.g. by the controller 11) of the bleeding behavior may in particular be performed using an assessment of the overprinted lines of the second color 9. An analysis using printed edges is also conceivable.

The most varied criteria exist for the assessment of lines, among other things the line width, the edge smoothness and the edge sharpness. The assessment of edge smoothness and edge sharpness are considered for edges.

Figure 7:
FIG. 7 illustrates an example of an analysis of a local line width according to an exemplary embodiment of the disclosure.

FIG. 7 shows an example of an analysis of a local line width.

For the determination of the line width, also referred to as stroke thickness, the starkest change of the brightness at both edges of the line is determined. In an exemplary embodiment, the determination is performed using what is known as the gradient method for the transitions of the first color to the second color.

For this, gradient contours 14 are first identified by image processing, and a distance (pitch) between the gradient contours 13 is measured. The distance 14 of the two gradient contours 13 represents the line width.

In an exemplary embodiment, the measurement principle takes place according to the draft of ISO 13660 "Measurement of Image Quality Attributes for Hardcopy Output"; Paragraph 6.3 "Line Width".

In an exemplary embodiment, an occurrence of local bleeding is determined if the measured line width exceeds a predetermined value (for example 50 μm, 100 μm or 200 μm, depending on print resolution, type of recording medium, and primer used, given a single-point line).

Figure 8:
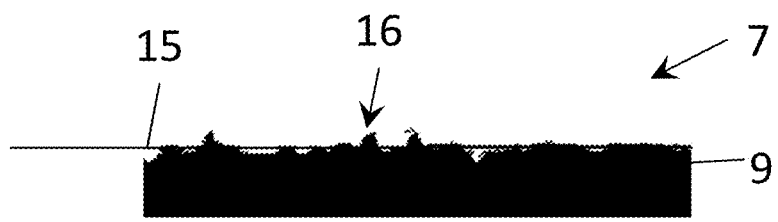
FIG. 8 illustrates an example of an analysis of a local edge smoothness according to an exemplary embodiment of the disclosure.

FIG. 8 shows an example of an analysis of a local edge smoothness.

For this, the position of an ideal edge 15 is initially determined, wherein the starkest change of the brightness is determined according to the gradient method for the transition from the first color 7 to the line element printed with the second color 9.

The mean absolute deviation of the real geometry 16 from the ideal edge 15 describes the edge smoothness.

In an exemplary embodiment, the evaluation takes place according to ISO 13660 "Information Technology—Office Equipment—Measurement of image quality attributes for hardcopy output—Binary monochrome text and graphic images".

If the measured local edge smoothness exceeds a predetermined value (for example 20 μm, 50 μm or 100 μm, depending on recording medium and primer used), this allows a conclusion of locally occurring bleeding.

Figure 9:
FIG. 9 illustrates an example of an analysis of a local edge sharpness according to an exemplary embodiment of the disclosure.

FIG. 9 shows an example of an analysis of a local edge sharpness.

Initially, a 20% threshold contour 16 and an 80% threshold contour 17 of the respective edge are determined for the transition from line element printed by the first color 7 to the line element printed with the second color 9.

To determine the threshold contours 16, 17, the reflection values—meaning a reflection factor (also referred to as a reflection coefficient)—of the first color 7 and of the second color 9 are determined.

Since the first color here is a light color, the reflection value of the first color represents a highest reflection factor (also referred to as a reflection coefficient) Rmax. In an exemplary embodiment, the second color is a dark color, or black, and thus has a minimum reflection factor Rmin. The reflection factors may, for example, be learned from a manufacturer specification or be measured with commercially available spectral photometers.

In an exemplary embodiment, the 20% threshold (Th20) or the 80% threshold (Th80) are then calculated as follows:

$$Th20 = Rmax - 20\% * (Rmax - Rmin)$$

$$Th80 = Rmax - 80\% * (Rmax - Rmin)$$

In an exemplary embodiment, the threshold contours 16 and 17 that are associated with the 20% threshold Th20 and the 80% threshold 80% are set at the location of the mean reflection having the respective value. The distance 18 between the 20% threshold contour 16 and the 80% threshold contour 17 then represents the edge sharpness of the respective edge.

In an exemplary embodiment, the evaluation takes place according to ISO 13660 "Information Technology—Office Equipment—Measurement of image quality attributes for hardcopy output—Binary monochrome text and graphic images".

If the measured local edge sharpness exceeds a predetermined value (for example 20 μm, 50 μm or 100 μm, depending on recording medium and primer used), this allows a conclusion of locally occurring bleeding.

In an exemplary embodiment, analysis of a color deviation, what is known as a Delta E observation, in the region of the overprinted pattern of the second color represents an additional possibility for determining the bleeding behavior.

Delta E, often written as dE or ΔE, is a measure of the perceived color difference. In a three-dimensional space, a color location can be assigned to every real occurring color, as well as every color emitted or measured by a device. According to ISO 12647 and ISO 13655, the value of Delta E between the color locations $L^*_p, a^*_p, b^*_p$ and $L^*_v, a^*_v, b^*_v$ are calculated as a Euclidean distance:

$$\Delta E_{p,v} = \sqrt{(L^*_p - L^*_v)^2 + (a^*_p - a^*_v)^2 + (b^*_p - b^*_v)^2}$$

To evaluate color deviations ΔE (color differences ΔE) as a Euclidean distance of the L*a*b* values, or from the polar coordinates L*C*h*, the assessment labeled in the following table is typically indicated.

| ΔE evaluation | |
|---|---|
| 0.0 ... 0.5 | no to nearly no difference |
| 0.5 ... 1.0 | difference may be perceptible to the trained eye |
| 1.0 ... 2.0 | noticeable color difference |
| 2.0 ... 4.0 | perceived color difference |
| 4.0 ... 5.0 | significant color difference that is seldom tolerated |
| above 5.0 | the difference is evaluated as a different color |

If bleeding occurs, this leads to a color deviation from a print image without bleeding. For example, if the first color is yellow and the second color is black, due to the bleeding the overall color impression would be distinctly darker by comparison, such that a measurable color device is created.

For example, a local color deviation in a predetermined range (for example >0.5 ΔE, >1 ΔE or >1.5 ΔE) may allow a conclusion of a locally occurring bleeding between the first and second color.

FIG. 10 shows a schematic depiction of a primer inkjet station 2 according to an exemplary embodiment.

Depicted here is a schematic plan view of what is known as the nozzle or print nozzle plate, which is provided on a side of the primer inkjet station 2 that faces toward the recording medium.

In the primer inkjet station 2, five print heads 20 arranged side by side are provided here purely as an example. Naturally, the number of print heads 20 may vary depending on size and width of the printing region 3. It would also be conceivable to provide only a single print head 20 having the required width, or to design the primer inkjet station 2 as a single print head extending over the entire width of the printing region 3.

Each of the print heads 20 has a plurality of print nozzles 21.

Purely for improved clarity, only nine print nozzles 21 which are arranged next to and offset from one another are depicted at each of the print heads 20. In an actual print head, a very much greater number of print nozzles 21 is typically provided in an actual print head, which print nozzles 21 have very much smaller dimensions in comparison to the size of the print head. The most varied arrangements for print nozzles are thereby possible. The dimensions as well as the number and type of the arrangement of the print nozzles 21 can be varied in a many and various ways.

A conventional inkjet print head 20 can be used for the primer inkjet station 2. For example, thus may be thoroughly flushed before a use in the primer inkjet station 2 in order to remove possible inks used in industrial quality assurance, without leaving residues. This is advantageous, since otherwise a flocculation of an ink residue in the print nozzle 21 might be caused by the coating substance 5, which would have result in a direct failure of the nozzle.

A distance of the print nozzles 21 relative to one another in particular depends on the type of print heads 20 that is used, which in turn determine the resolution printable with the primer inkjet station 2. In an exemplary embodiment, the primer inkjet station 2 may be designed with a resolution of 600 dpi. This corresponds to a distance of two print nozzles of approximately 42.3 μm. Naturally, the print nozzle distance can be varied or scaled depending on the desired resolution. For example, at a resolution of 300 dpi the print nozzle distance would then be 84.6 μm.

Although the present disclosure has been described in the preceding entirely using preferred exemplary embodiments, it is not limited to these, but rather can be modified in many and various ways.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 primer inkjet station
3 printing region
4 recording medium
5 coating substance
6 ink inkjet station
7 first color
8 print image
9 second color
10 sensor
11 controller
12 sensory recording
13 gradient contour
14 distance
15 ideal edge
16 20% threshold contour
17 80% threshold contour
18 distance
19 segment
20 print head
21 print nozzle
S1-S6 steps
v feed

The invention claimed is:

1. A method for automatic adaptation of a quantity of a coating substance applied in the printing to a recording medium in a printing system, the method comprising:
    inkjet printing the coating substance to a printing region of the recording medium;
    overprinting a first color across a width of the printing region of the recording medium and atop the coating substance;
    overprinting a print image of a second color atop the first color;
    sensory recording the printing region having been printed to;
    analyzing a local bleeding behavior of the first and the second colors based on the sensory recording; and
    locally adapting a printed quantity of the coating substance, based on the analysis of the local bleeding behavior, in segments of the printing region that are affected by bleeding, wherein the coating substance improves adhesion of: (1) color particles of the first color overprinted on top of the coating substance, and (2) the print image of the second color printed on top of the first color, so that the color particles adhere onto the recording medium.

2. The method according to claim 1, wherein the first color is provided with a high contrast relative to the second color.

3. The method according to claim 1, wherein the first color and/or the second color is printed using inkjet printing.

4. The method according to claim 1, wherein the print image has at least one continuous or regularly repeating edge between the first and the second colors, across the width of the printing region, and the analysis of the bleeding behavior of the first and the second colors is performed along the edge.

5. The method according to claim 4, wherein the analysis of the bleeding behavior comprises:
assessing an edge smoothness and/or an edge sharpness of the edge, wherein the assessing includes a comparison of a determined edge smoothness value and/or a determined edge sharpness value of the edge with one or more predetermined nominal values and/or tolerances.

6. The method according to claim 1, wherein the first color is overprinted across a predetermined length and across the entire width of the printing region of the recording medium that was printed to with the coating substance.

7. The method according to claim 1, wherein the print image of the second color is overprinted atop the first color in the form of a pattern including thin lines.

8. The method according to claim 7, wherein the pattern is provided in the form of a grid of thin lines.

9. The method according to claim 7, wherein the thin lines are overprinted in a form of a single-point line.

10. The method according to claim 7, wherein:
the recording of the printing region includes a measurement of a color deviation in a region of the pattern; and
the analysis of the bleeding behavior includes a comparison of the color deviation, the comparison including a comparison of a measured Delta E value with a predetermined nominal value and/or one or more predetermined tolerances.

11. The method according to claim 1, wherein the locally adapting of the printed quantity of the coating substance comprises an activation of individual inkjet print heads, of individual groups of inkjet print nozzles, or of individual inkjet print nozzles, for a local application of the adapted quantity of the coating substance.

12. The method according to claim 11, wherein the inkjet print heads, groups of inkjet print nozzles or individual print nozzles that are to be adapted for local adaptation of the printed quantity of the coating substance are identified using a position of the segments of the width of the printing region that are affected by bleeding.

13. The method according to claim 1, wherein the sensory recording of the printed print image is performed by a camera integrated into the printing system, the camera being directed toward the recording medium.

14. The method according to claim 1, wherein the overprinting of the first and the second color is performed during a regular printing process including a printing of a regeneration print image and/or at an edge provided for cutting.

15. The method according to claim 1, wherein the coating substance is a primer.

16. A non-transitory computer-readable storage medium with an executable program stored thereon, wherein, when executed, the program instructs a processor to perform the method of claim 1.

17. A printing system configured to automatic adapt a quantity of a coating substance that is applied in printing to a recording medium by the printing system, the printing system comprising:
a primer inkjet station configured to print the coating substance to a printing region of the recording medium;
an ink inkjet station configured to overprint a first color across a width of the printing region of the recording medium having been printed to with the coating substance, and to overprint a print image of a second color atop the first color;
a sensor configured to sensory recording the printing region having been printed to; and
a controller coupled with the sensor and the primer inkjet station, and configured to analyze a local bleeding behavior of the first and the second colors based on the sensory recording, and to locally adapt the printed quantity of the coating substance, based on the analysis of the local bleeding behavior, in segments of the printing region that are affected by bleeding, wherein the coating substance improves adhesion of: (1) color particles of the first color overprinted on top of the coating substance, and (2) the print image of the second color printed on top of the first color, so that the color particles adhere onto the recording medium.

18. The method according to claim 1, wherein the coating substance is colorless.

* * * * *